Oct. 20, 1953  K. A. SKARDAL ET AL  2,655,840
APPARATUS FOR DEFIBERATING WASTE PAPER
Filed March 22, 1950  2 Sheets-Sheet 2

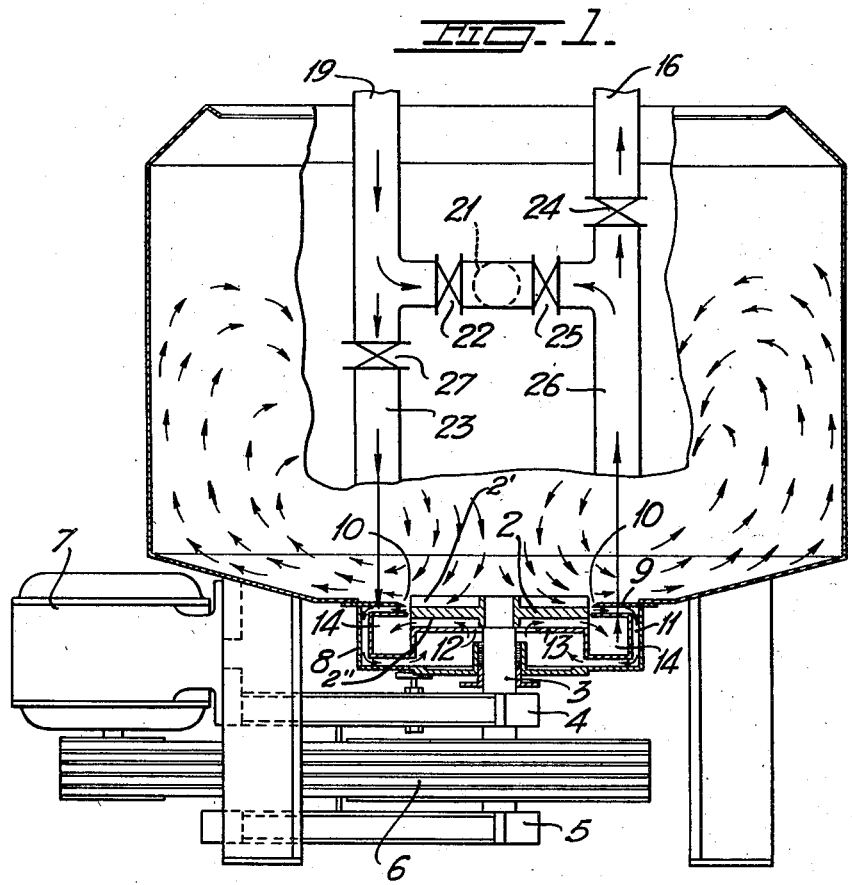
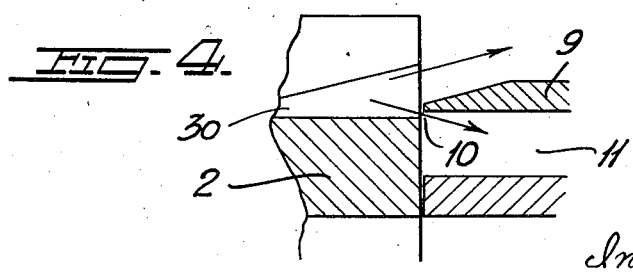

Patented Oct. 20, 1953

2,655,840

UNITED STATES PATENT OFFICE 2,655,840

APPARATUS FOR DEFIBRATING WASTE PAPER

Karl Arvid Skardal, Stockholm, and Olov Birger Börjeson, Bromma, near Stockholm, Sweden Application March 22, 1950, Serial No. 151,064 In Sweden July 5, 1949

3 Claims. (Cl. 92—26)

The present invention relates to a machine for preparing a watery suspension of such paper as is obtained as a waste product in paper mills, due, for instance, to breakage of the paper web passing through the paper machine proper, or comprising waste strips and sheets resulting from treating the paper in other machines. The object of preparing such a suspension is to allow the waste paper to be again supplied as a raw material to the paper making machine.

Hitherto, as a rule, waste paper of the kinds above indicated was collected in boxes to be then made up into packets and conveyed back to the Hollander of the paper mill where it was again suspended into water together with the cellulose or wood pulp constituting the normal raw material for the paper manufacture. Owing to the great amount of work required in making said packets and conveying them back to the Hollander and considering the fact that, in charging the Hollander, the proportion by weight between cellulose and waste paper should be comparatively constant at this early state of the manufacturing process, the procedure above outlined of treating the waste paper is rendered complicated and heavy.

In certain paper mills it is usual practice to install a separate Hollander, hereinafter referred to as a dissolving Hollander, in the neighbourhood of the paper making machine for treating the waste paper as soon as possible in order to return it to the paper manufacturing process in the shape of a watery suspension or pulpy mass delivered to the pulp container immediately in front of the paper making machine. By this means certain drawbacks are eliminated, as for instance, the drag appearing in the circulation in case of shift of quality, since the paper pulp obtained as a result of suspending the waste paper is ready for being supplied to the paper making machine, as far as its disintegration etc. is concerned.

In many cases, however, such a dissolving Hollander cannot be used from considerations of space. Furthermore, this Hollander requires a pulp pump mounted on a level below that of the bottom of the dissolving Hollander and, as a further drawback, the output will be comparatively low with relation to the consumption of power, which in connection with other circumstances renders such a plant expensive both as regards its erection and operation.

The present invention has for its object to eliminate the above said drawbacks to the largest extent possible. The machine according to the invention comprises a dissolving vessel in the bottom of which is mounted a circulation pump, the circulation path of which includes a narrow passage through which the contents of the vessel must pass before discharged from the machine. To this end the circulation pump may also act as an emptying pump.

The invention will be more clearly explained by the following detailed specification with reference to the accompanying drawings, in which a preferred embodiment of the invention is illustrated. In the drawings:

Fig. 1 is a vertical section of the machine with a portion thereof shown in elevation.

Fig. 4 is a section of the narrow passage of the circulation path on a larger scale.

Figure 2:
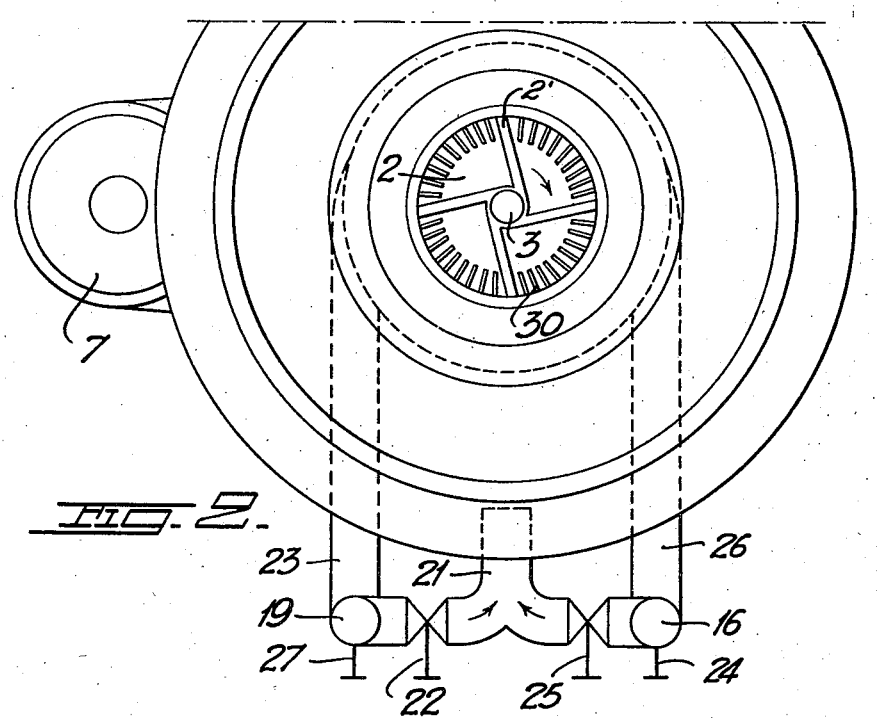
Fig. 2 is a plan view of the machine with certain parts removed.

In the example shown the dissolving vessel comprises a substantially cylindrical container 1 the bottom of which is formed with an opening surrounding a pump wheel in the shape of a horizontal disc 2 having blades 2', 2'' on its upper and lower surfaces, respectively. The pump wheel disc 2 is supported by a downwardly extending vertical shaft 3 mounted in bearings 4 and 5 below the container. Shaft 3 is driven, for instance, by means of a rope transmission 6 from a motor 7. The lower portion of the pump wheel 2 is enclosed in a specially designed pump casing 8, the construction of which will best appear from the description of the operation of the machine, hereinafter to follow.

The pump casing 8 is provided with a top wall 9 in the shape of a sheet metal ring covering the annular space between the edge of the opening in the bottom of the container and the circumference of the pump wheel 2. The inner circular edge of the wall member 9 is chamfered and the lower surface thereof is situated on a level slightly above the level of the upper surface of disc 2 of the pump wheel so as to form a vertical annular gap 10 between itself and the upper peripheral edge of disc 2, as clearly shown in Fig. 4. Said gap 10 is of the size of 1 to 5 mm. or thereabout. Gap 10 connects the interior of container 1 with a suction channel 11 in the pump casing 8, said suction channel 11 communicating through an opening 12 in an intermediate bottom 13 in the pump casing with the pressure chamber 14 of the pump casing, as shown in Fig. 1. The pump wheel 2 supports on its upper surface in the spaces between the pump blades 2' sets of annular guide blades 30 provided along the periphery of the disc at small peripheral distances apart, about 3 mm., in order to prevent material not sufficiently finely divided or dispersed from reaching the gap 10. The radial length of said guide blades is small as compared with the radius of the disc.

Figure 3:
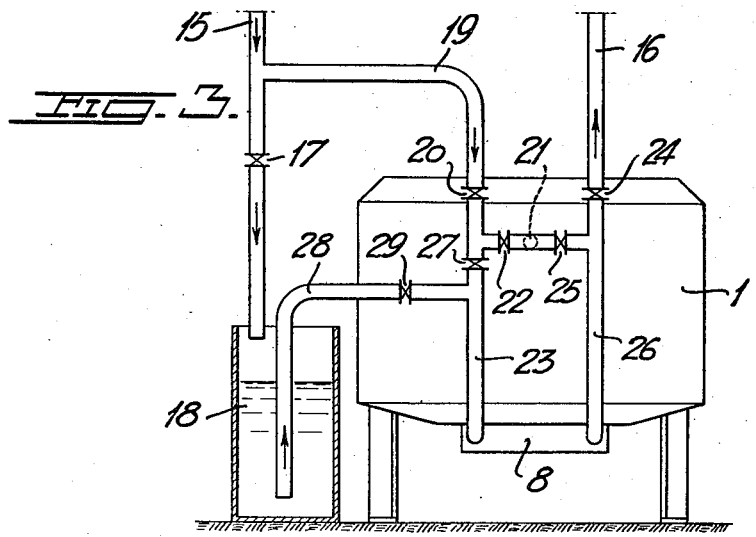
Fig. 3 is an elevation of the machine on a smaller scale with a portion thereof shown in vertical section.

The container 1 is connected in a pipe system which will best appear from Fig. 3 but is also indicated in parts in Figs. 1 and 2. The reference numeral 15 designates the supply pipe and the reference numeral 16 the discharge pipe of the system.

The supply pipe 15 bifurcates into a branch pipe including a valve 17 which leads to a tank 18 and another branch pipe 19 including a valve 20 which is connected to a T-pipe 21 via a valve 22, and to a pipe 23, via a valve 27, which leads to the suction side of the pump casing 8. The discharge pipe 16 is provided with a valve 24 and bifurcates below said valve into a branch leading to the T-pipe 21 via a valve 25 and another branch 26 leading to the pressure side of the pump casing 8. Branching off from a point of pipe 23 below valve 27 is a branch pipe 28 leading to the lower portion of tank 18. Inserted in said pipe 28 is a valve 29.

Before describing the operation of the machine above described it is to be noted that the machine can be used for intermittent or continuous charging. Hereinafter these two methods of operation will be described separately.

Intermittent operation

In operation on this method water supplied through pipe 15 may pass either, that is to say, with valve 17 closed, valve 20 open, valve 27 closed, and valve 22 open, to the container 1 via T-pipe 21 or, that is to say, with valve 17 closed, valve 20 open, valve 22 closed, valve 27 open, and valve 29 closed, to the suction side of pump casing 8 wherein usually prevails a pressure below the atmospheric pressure, whereby the admission of water is promoted. After an appropriate amount of water is admitted to the container 1 in the one way or the other of those above indicated, waste paper is supplied to the container until a preferred concentration of the mixture of paper and water is obtained. After the container is charged in the way described, the pump wheel is brought into operation and continues to rotate until the paper is sufficiently suspended in the water to form a suspension fit for treating it to the paper making machine. During the operation of the pump wheel valves 27, 22 and 24 are closed, while valve 25 is open. Thus, the pump wheel circulates the suspension from within the container 1 via gap 10 into the suction passage 11 of the pump casing, and thence through opening 12 to the under side of the pump wheel the lower sets of blades 22 of which forces the material into the pressure chamber 14 from where the material enters pipe 26 and passes via the open valve 25 and the T-pipe 21 back into the container. This circulation is indicated by arrows in Fig. 1. During the circulation such pieces of paper only may enter the pump casing which are sufficiently defibrated to pass through gap 10. The remainder of the paper suspended is caused to recirculate in the container, as also shown by arrows. It is thus seen that on emptying the container such material only which has passed the gap 10, that is to say, which is sufficiently defibrated, may be discharged from the container. The emptying is effected through the pipe system 26 and 16, when valve 25 is closed and valve 24 is open. The emptying is effected by the action of the lower set of blades 2″ of the pump wheel, while the upper set of blades 2′ maintains the contents of the container 1 in circulation. The consumption of power when operating in this way is required substantially for maintaining said circulation.

Continuous operation

In continuous operation the tank 18 is included in the pipe system. In said tank a constant water level is maintained, as for instance, by controlling valve 17 by means of a level regulator. In the continuous operation of the machine, valves 27, 22 and 20 are closed and valve 29 is open. On the pressure side of the pump, valve 24 is open, while valve 25 is open to such an extent only as is required to cause the major portion of the pulp mass passing through the pump to recirculate to the container, whereas a minor portion corresponding to the quantity of paper continuously supplied to the container may be continuously discharged through pipe 16. The purpose of the level tank 18 is to allow the pump according as the concentration of the contents of the container 1 increases to automatically suck an increased amount of water owing to a more slow rate of flow through the gap 10 and a resulting reduction of the pressure in the suction channel 11 of the pump casing.

What we claim is:

1. An apparatus of the class described, comprising in combination, a container for receiving a mixture of waste paper and water, said container having a circular opening in its bottom, a blade wheel mounted for revolving in said opening, said blade wheel comprising a horizontal disc having plane upper and lower surfaces, a set of agitator blades on each of said surfaces and a set of guide vanes provided at the periphery of the upper surface of the disc, said upper surface of the disc being located on a lower level than the lower surface of the surrounding bottom to form a passage for horizontal flow therebetween, an annular pump casing secured to the lower surface of said bottom to surround the disc and the lower set of blades thereof, said pump casing having a suction channel in communication with said passage for receiving the horizontal flow therefrom and converting it into an upward flow towards the center of the lower set of blades of the blade wheel, said pump casing having also an annular pressure chamber in communication with the lower set of blades of the pump wheel at the periphery thereof.

2. An apparatus as claimed in claim 1 having the further feature that the upper surface of the disc of the blade wheel is provided with a set of agitator blades extending to the periphery of the disc and a group of guide vanes ending at the periphery of the disc between each two agitator blades, the height of the guide vanes in the axial direction of the blade wheel being less than that of the agitator blades, the guide vanes tapering in height from their outer ends towards their inner ends.

3. An apparatus as claimed in claim 1 having the further feature that the edge of the bottom surrounding the blade wheel is tapered by chamfering of its upper surface.

KARL ARVID SKARDAL.
OLOV BIRGER BÖRJESON.

References Cited in the file of this patent

UNITED STATES PATENTS

| Number | Name | Date |
|---|---|---|
| 357,686 | Nacke | Feb. 15, 1887 |
| 1,431,422 | Randecker | Oct. 10, 1922 |
| 1,951,684 | Wells | Mar. 20, 1934 |
| 2,265,936 | Cowles | Dec. 9, 1941 |
| 2,289,612 | Wells | July 14, 1942 |
| 2,351,728 | Wells | June 20, 1944 |
| 2,424,726 | Wells | July 29, 1947 |